(12) United States Patent
Falk

(10) Patent No.: US 11,533,165 B2
(45) Date of Patent: Dec. 20, 2022

(54) SIGNAL AND/OR DATA TRANSMISSION AND/OR ENCRYPTION UNIT, PRN CODE GENERATOR, INTEGRATED INTEGRITY CHECK, AND COMPUTER-AIDED METHOD FOR SECURE SIGNAL TRANSMISSION

(71) Applicant: Siemens Aktiengesellschaft, Munich (DE)

(72) Inventor: Rainer Falk, Poing (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/149,261

(22) Filed: Jan. 14, 2021

(65) Prior Publication Data

US 2021/0226776 A1 Jul. 22, 2021

(30) Foreign Application Priority Data

Jan. 16, 2020 (EP) .................................... 20152234

(51) Int. Cl.
*H04L 9/06* (2006.01)
(52) U.S. Cl.
CPC ........ *H04L 9/0656* (2013.01); *H04L 2209/80* (2013.01)
(58) Field of Classification Search
CPC . H04L 9/0656; H04L 2209/80; H04L 9/0662; H04L 9/002; H04L 63/123;
(Continued)

(56) References Cited

U.S. PATENT DOCUMENTS 7,120,696 B1  10/2006  Au et al. .................... 709/229
10,225,038 B2  3/2019  Falk
(Continued)

FOREIGN PATENT DOCUMENTS

DE   102014212467 B3   10/2015  ............... H04L 9/22
DE   102014212488 A1   12/2015  ............. G01S 19/20
(Continued)

OTHER PUBLICATIONS

Extended European Search Report, Application No. 20152234.9, 8 pages, dated Jun. 25, 2020.
(Continued)

*Primary Examiner* — Baotran N To
(74) *Attorney, Agent, or Firm* — Slayden Grubert Beard PLLC

(57) ABSTRACT

Signal, data transmission, and/or encryption units generating a cryptographic code using a cryptographic key before writing to a pseudorandom noise buffer memory. The PRN code generator comprises a first processor generating a PRN code from initial data using a cryptographic key. A second processor generates sections of the PRN code for integrity check purposes through computation using the same cryptographic key and initial data. Within the PRN code generator and before temporary storage of the PRN code in the buffer memory, there is a comparison device for comparing at least one duplicated section of the PRN code sequence cryptographically generated by the first processor with the section computed by the second processor. A blocking, stop and/or alarm function is activated in the comparison device and triggered on the basis of a predefined degree of matching between the section obtained through duplication and the computed section.

16 Claims, 3 Drawing Sheets

(58) Field of Classification Search
CPC ......... H04L 63/16; G01S 19/02; G01S 19/37; G01S 19/015; G01S 19/20; H04B 1/70735
See application file for complete search history.

(56) References Cited

U.S. PATENT DOCUMENTS

| | | | |
|---|---|---|---|
| 10,659,187 B2 | 5/2020 | Falk | |
| 2014/0354473 A1* | 12/2014 | Wallner | G01S 19/01 342/357.51 |
| 2015/0317475 A1 | 11/2015 | Aguayo Gonzalez et al. | 726/23 |
| 2015/0381307 A1* | 12/2015 | Falk | H04L 9/0668 380/268 |
| 2015/0381308 A1* | 12/2015 | Falk | H04K 1/02 380/268 |
| 2017/0364690 A1* | 12/2017 | Wendel | G01S 19/25 |

FOREIGN PATENT DOCUMENTS

| | | | | |
|---|---|---|---|---|
| DE | 102015212037 A1 | 12/2016 | ............ | H04L 12/26 |
| EP | 2051092 A1 | 4/2009 | ............ | G01S 19/37 |
| EP | 3301481 A1 | 4/2018 | ............ | G01S 19/05 |

OTHER PUBLICATIONS

Chinese Office Action, Application No. 202110061035.6, 20 pages, dated Oct. 8, 2022.

* cited by examiner

SIGNAL AND/OR DATA TRANSMISSION AND/OR ENCRYPTION UNIT, PRN CODE GENERATOR, INTEGRATED INTEGRITY CHECK, AND COMPUTER-AIDED METHOD FOR SECURE SIGNAL TRANSMISSION

CROSS-REFERENCE TO RELATED APPLICATIONS

This application claims priority to EP Application No. 20152234.9 filed Jan. 16, 2020, the contents of which are hereby incorporated by reference in their entirety.

TECHNICAL FIELD

The present disclosure relates to signal transmission. Various embodiments of the teachings herein may include signal transmission units having a PRN code generator, as is able to be used for example in "spread spectrum" transmission for bidirectional or unidirectional signal transmission or satellite-aided navigation, in particular a PRN code generator with integrated integrity checking, and methods for secure signal transmission by way of integrity checking within a PRN code generator.

BACKGROUND

Pseudorandom code sequences, what are known as pseudorandom noise codes, abbreviated to PRNC or PRN codes or PRN code sequences, are used in radio transmission and in navigation systems. They may be used as spread codes that bring about frequency spreading of a message signal. Due to the wideband transmission, such a signal is robust against interference. Spread sequences are used for example in satellite navigation systems GNSS (global navigation satellite system), such as GPS (global positioning system), Glonass, Beidou, and/or Galileo. In this case, the received satellite signal is generally below a noise level. A receiver is able to detect and decode the emitted signal only through correlation with an appropriate PRN code that it itself contains.

Systems use cryptographic PRN codes in spread spectrum transmission. The code sequence is in this case generated on the basis of a cryptographic key. A receiver is able to generate the appropriate PRN code in order to correlate and decode the reception signal only if it knows the PRN code used by the transmitter to transmit the signal. It requires the cryptographic key for this purpose.

Methods for modulating signals are described in U.S. Ser. No. 10/225,038 B2, which make it impossible or at least extremely difficult to be able to extract, from a secure signal, the replica pseudorandom noise code and/or correlation key that it contains. A PRN code may be used in particular in spread spectrum transmission to modulate data signals, for example through multiplication and/or mixing with the PRN code signal sequence, and/or a PRN code may be used to receive a reception signal, for example through correlation with the PRN code signal sequence. The bits—which are also referred to as "chip"—of a PRN code sequence are generally generated at a high data rate, for example a few Mbit/sec or even Gbit/sec.

U.S. Pat. No. 7,120,696B1 describes a cryptographic communication system that discloses generating a cryptographic PRN code. A cryptographically generated PRN code may be used to protect the data and/or signal transmission on a "physical layer security" transmission layer, in particular in the case of wireless transmission. By way of example, this may be the case for a bidirectional or unidirectional data transmission, for example for data transmission or for satellite-aided navigation. The security of the data transmission in this case depends on whether the PRN code sequence that is used is actually cryptographically generated as expected.

If not, a transmitter could transmit a transmission signal with insufficient protection. It could be the case at a receiver that reception properties are worsened and/or local attacks on the device are made easier, for example using a side channel attack.

"Side channel attack" describes a cryptographic method that makes use of the physical implementation of a cryptosystem in a device such as a chip card. The principle is based on observing a cryptographic device when executing cryptographic algorithms and finding correlations between the observed data and the key that is used. This characteristic information may be obtained by analyzing the runtime of the algorithm, the energy consumption of the processor during the computing operations and/or the electromagnetic radiation. Active invasive attacks involve intervening in the device and introducing errors in the execution of the cryptographic algorithm. Side channel analysis provides information in this regard.

A side channel attack is normally performed by an attacker in order to reconstruct a cryptographic key that is used. Such technologies for recording and evaluating side channel information may also in principle be used constructively in order to monitor the integrity of a device, see for example U.S. Pat. No. 9,430,644B2. Such monitoring is however highly complex and is more suitable for recognizing a basic malfunction of a device. An integrity infringement would also be recognized only with a relatively long time delay.

SUMMARY

Against this background, the teachings of the present disclosure describe methods for checking the integrity of a PRN code generator, in particular a self-monitoring test that is able to be performed efficiently and that takes place in real time during the PRN code generation. For example, some embodiments include a signal and/or data transmission and/or encryption unit having a pseudorandom noise "PRN" code generator, as is able to be used within baseband processing of a transmitter and/or receiver unit or in an encryption/decryption unit, such that a cryptographic PRN code is generated in the PRN code generator on the basis of a cryptographic key before any write operation is performed to a pseudorandom noise buffer memory from which this is able to be read by a modulation, demodulation, correlator, encryption and/or decryption unit, wherein the PRN code generator comprises at least one first processor that generates a PRN code from initial data using a cryptographic key and also comprises at least one second processor, wherein the second processor generates sections of the PRN code for integrity check purposes through computation on the basis of the same cryptographic key and the same initial data, such that, within the PRN code generator and before temporary storage of the PRN code in a/the buffer memory (code buffer), at least one comparison device is provided for comparing at least one duplicated section of the PRN code sequence cryptographically generated by the first processor with the at least one section of the sections computed by the second processor, wherein a blocking, stop and/or alarm function is able to be activated in the comparison device and is able to be triggered on the basis of a predefined degree of matching between the at least one section obtained through duplication and the at least one computed section.

In some embodiments, the system conducts unidirectional signal transmission.

In some embodiments, the system conducts bidirectional data transmission.

In some embodiments, the code generator, the first and/or the second processor is implemented fully or partly in the form of a reconfigurable hardware platform, such as an ASIC/FPGA component of the transmission unit.

In some embodiments, the code generator, the first and/or the second processor is implemented fully or partly in software form.

In some embodiments, the alarm function blocks read access to the code buffer memory.

In some embodiments, wherein the stop function stops the first processor.

In some embodiments, the stop function is implemented in the form of an erase component.

In some embodiments, there is provision for an alarm signal to be provided to the comparison device 27 as alarm function.

In some embodiments, there is provision for the comparison device to contain a memory in which the determined check data from the comparison are able to be stored for evaluation purposes.

As another example, some embodiments include a computer-aided method for secure signal transmission by way of integrity checking within a PRN code generator, comprising the following method steps: providing a digital signal for baseband processing; generating a PRN code in the PRN code generator on the basis of a cryptographic key; simultaneously computing at least sections of the code sequence in advance using the PRN code generator, including on the basis of the same cryptographic key; duplicating the generated PRN code before it is buffer-stored in the code buffer memory of the PRN code generator; comparing the duplicate or sections thereof with computed PRN code sections as an integrity check for the PRN code; evaluating the result of the comparison, with the result that either the PRN code stored in the PRN code generator is stored in unhindered form in the code buffer memory for correlation in the correlator and forwarded; or an ALARM command 30, an ERASE command 28 and/or a DISABLE READ command 32 and/or a STOP command 29 interrupts the signal transmission.

In some embodiments, at least one section, determined through simultaneous advance computation, of the code sequence is compared with a duplicated section within a predefined time interval.

In some embodiments, the triggering of a stop and/or alarm function as a result of the integrity check is coupled to a predefined threshold value.

In some embodiments, the triggering of a stop and/or alarm function as a result of the integrity check is coupled to the exceedance of a predefined threshold value within a predefined time interval.

In some embodiments, a stop function that stops the code generation is triggered in the event of a non-match.

In some embodiments, the method is used for encrypted unidirectional or bidirectional data transmission.

DETAILED DESCRIPTION

Various embodiments of the teachings herein may include a signal and/or data transmission and/or encryption unit having a pseudorandom noise "PRN" code generator, as is able to be used within baseband processing of a transmitter and/or receiver unit or in an encryption/decryption unit, such that a cryptographic PRN code is generated in the PRN code generator on the basis of a cryptographic key before any write operation is performed to a pseudorandom noise buffer memory from which this is able to be read by a modulation, demodulation, correlator, encryption and/or decryption unit, wherein the PRN code generator comprises at least one first processor that generates a PRN code from initial data using a cryptographic key and also comprises at least one second processor, wherein the second processor generates sections of the PRN code for integrity check purposes through computation on the basis of the same cryptographic key and the same initial data, such that, within the PRN code generator and before temporary storage of the PRN code in a/the buffer memory (code buffer), at least one comparison device is provided for comparing at least one duplicated section of the PRN code sequence cryptographically generated by the first processor with the at least one section of the sections computed by the second processor, wherein a blocking, stop and/or alarm function is able to be activated in the comparison device and is able to be triggered on the basis of a predefined degree of matching between the at least one section obtained through duplication and the at least one computed section.

Some embodiments may be used in IT security including encryption, in this case in turn in particular spread spectrum transmission, also called spread spectrum, physical layer security.

Figure 4:
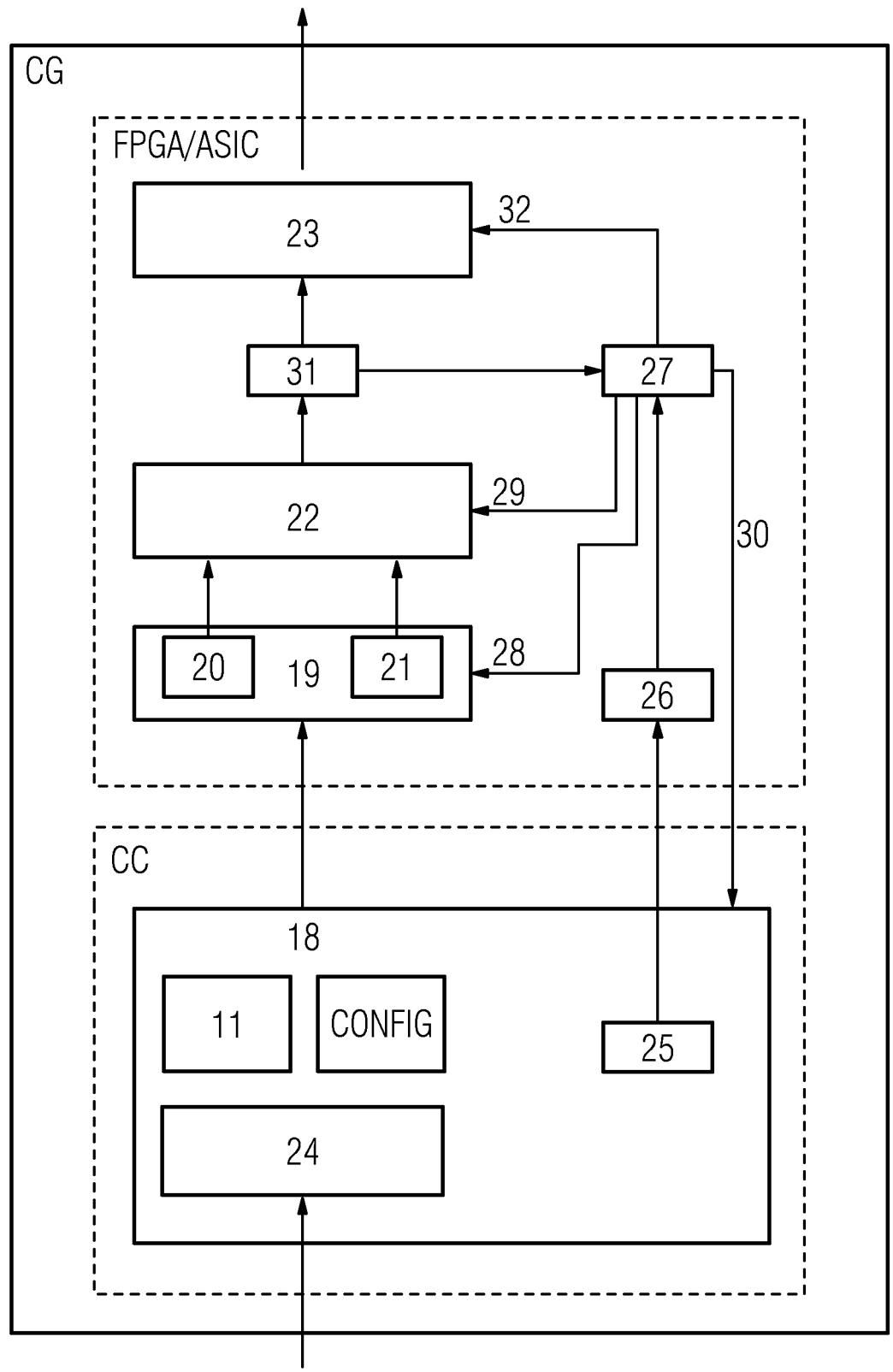
FIG. 4 is a drawing showing an exemplary embodiment of the code generator of the signal transmission unit and the sequence of the computer-aided method for secure signal transmission incorporating teachings of the present disclosure.

In some embodiments, the "comparison device" comprises a PRN code integrity check module 27—see FIG. 4.

Some embodiments include a signal and/or data transmission or encryption unit designed for unidirectional signal transmission. Some embodiments include a signal and/or data transmission or encryption unit designed for bidirectional data transmission.

Some embodiments include a signal and/or data transmission or encryption unit in which the code generator, the first and/or the second processor are implemented fully or partly in the form of a reconfigurable hardware platform, such as an ASIC/FPGA component of the transmission unit.

Some embodiments include a signal and/or data transmission or encryption unit, in which the code generator, the first and/or the second processor are implemented fully or partly in software form.

Some embodiments include a signal and/or data transmission or encryption unit, in which the alarm function blocks read access to the code buffer memory.

Some embodiments include a signal and/or data transmission or encryption unit, in which the stop function stops the first processor.

Some embodiments include a signal and/or data transmission or encryption unit, in which the stop function is implemented in the form of an erase component.

Some embodiments include a signal and/or data transmission or encryption unit, in which there is provision for an alarm signal, for example an electrical and/or optical alarm signal, to be provided as alarm function by the "comparison device", that is to say in particular the module 27 from FIG. 4, to the "PRN code integrity check module", so that another component inside and/or outside the code generator is able to respond thereto.

Some embodiments include a signal and/or data transmission or encryption unit, in which there is provision for the comparison device to contain a memory in which the determined check data from the comparison are able to be stored for evaluation purposes.

Some embodiments include a computer-aided method for secure signal transmission by way of integrity checking within a PRN code generator, comprising the following method steps:
  providing a digital signal for baseband processing
  generating a PRN code in the PRN code generator on the basis of a cryptographic key
  simultaneously computing at least sections of the code sequence in advance using the PRN code generator, including on the basis of the same cryptographic key
  duplicating the generated PRN code before it is buffer-stored in the code buffer memory of the PRN code generator,
  comparing the duplicate or sections thereof with computed PRN code sections as an integrity check for the PRN code,
  evaluating the result of the comparison, with the result that either the PRN code stored in the PRN code generator is stored in unhindered form in the code buffer memory for correlation in the correlator and forwarded, or
  an ALARM command 30, an ERASE command 28 and/or a DISABLE READ command 32 and/or a STOP command 29 interrupts the signal transmission.

Some embodiments include a computer-aided method for secure signal transmission by way of integrity checking, in which at least one section, determined through simultaneous advance computation, of the code sequence is compared with the duplicated section within a predefined time interval.

Some embodiments include a computer-aided method for secure signal transmission by way of integrity checking, in which the triggering of a stop and/or alarm function as a result of the integrity check is coupled to a predefined threshold value.

Some embodiments include a computer-aided method for secure signal transmission by way of integrity checking, in which the triggering of a stop and/or alarm function as a result of the integrity check is coupled to the exceedance of a predefined threshold value within a predefined time interval.

Some embodiments include a computer-aided method for secure signal transmission by way of integrity checking, in which a stop function that stops the code generation is triggered in the event of a non-match.

Some embodiments include a computer-aided method for secure signal transmission by way of integrity checking that is used for encrypted unidirectional or bidirectional data transmission.

In some embodiments, pseudorandom code sequences are able to be computed correctly, and thus in a trustworthy manner, at least in sections on a high-reliability specifically security-protected processor, such that sections of a pseudorandom code sequence are able to be computed in advance and compared with the corresponding sections of the PRN codes that are actually generated with a high data rate and then generated through duplication. In some embodiments, in the event of a predefined discrepancy between the duplicate and the computed section, an alarm signal and/or a blocking and/or stop function may be triggered that signal the lack of integrity of the generated PRN code and stop the transmission and decryption.

A PRN code is a pseudorandom code sequence (pseudorandom noise). A PRN code is for example generated cryptographically. It may be used in particular in spread spectrum transmission to modulate a data signal, for example through multiplication and/or mixing with the PRN code signal sequence, or to receive a reception signal—for example through correlation with the PRN code signal sequence. The bits—also referred to as chip—of a PRN code sequence are generally generated with a high data rate. "High data rate" denotes for example a data rate of a few Mbit/sec or even a few Gbit/sec.

A cryptographic PRN code may be used to protect the data transmission on a "physical layer security" transmission layer, in particular including in the case of wireless transmission. Wireless transmissions in this context involve bidirectional or unidirectional data transmission, for example for data transmission or for satellite-aided navigation. The security of the data transmission depends on whether actually expected PRN code sequences are generated.

A PRN code generator a device that generates a PRN code. This device is generally computer-aided and/or comprises a processor. The processor for generating the PRN code sequence may be implemented on the basis of a reconfigurable digital circuit, for example an FPGA or an ASIC having an embedded FPGA, or as reconfigurable digital logic. It may however also be implemented as a fixed digital circuit, for example on an ASIC.

Unless stated otherwise in the following description, the terms "perform", "compute", "computer-aided", "calculate", "establish", "generate", "configure", "reconstruct" and the like relate to operations and/or processes and/or processing steps that change and/or generate data and/or convert data into other data, wherein the data may be represented or be present in particular in the form of physical variables, for example in the form of electrical pulses. The expression "computer" should in particular be interpreted as broadly as possible in order in particular to cover all electronic devices having data processing properties. Computers may thus for example be personal computers, servers, hand-held computer systems, pocket PC devices, mobile radio devices and other communication devices that are able to process data in a computer-aided manner, processors, and other electronic data processing devices.

"Computer-aided" in the context of the disclosure may be understood to mean for example an implementation of the method in which in particular a processor performs at least one method step of the method.

Figure 1:
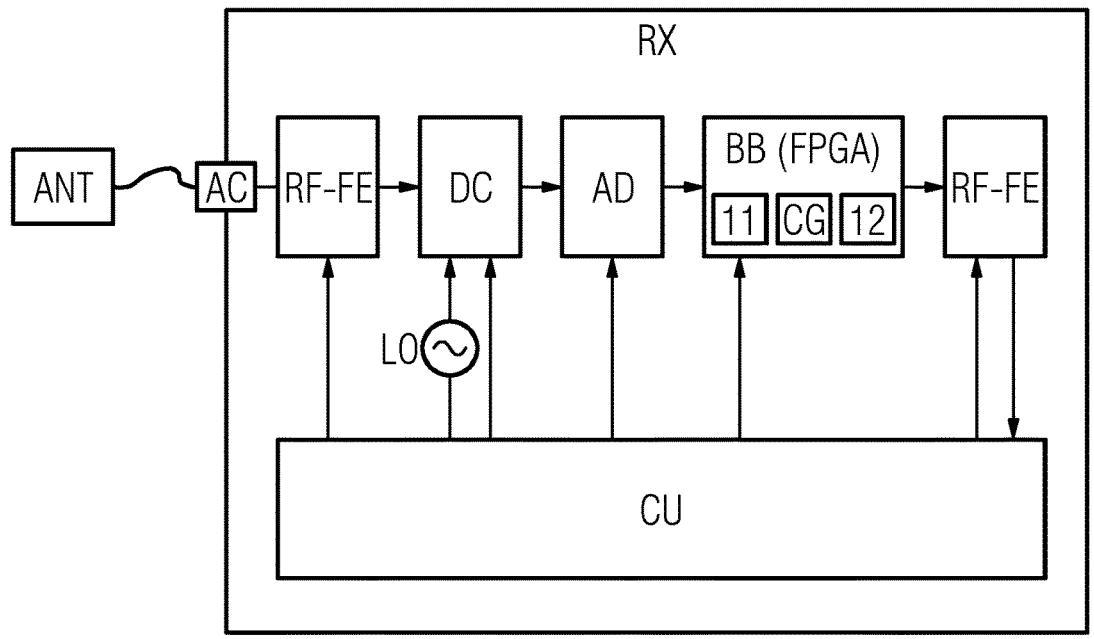
FIG. 1 is a drawing showing a block diagram of an example containing essential functional blocks of a receiver RX, to which an antenna ANT is able to be connected via an antenna connector AC, incorporating teachings of the present disclosure.

FIG. 1 shows an example block diagram containing essential functional blocks of a receiver RX, to which an antenna ANT is able to be connected via an antenna connector AC; an internal antenna could alternatively be provided. The signal provided by the antenna is processed by a radiofrequency assembly RF-FE—radiofrequency front end—for example filtered and/or amplified, and then provided to a down converter DC that mixes the signal with a signal from the local oscillator LO, what is called down conversion, and provides it to an analog-to-digital converter AD. This provides at least one digitized signal to the baseband processing BB, wherein a plurality of signals may also be provided, for example an I-signal in-phase signal component and/or a Q-signal quadrature signal component.

Within the baseband processing BB, a PRN code spread code is generated by a code generator CG and correlated with the digitized reception signal by a correlator Corr. The runtime estimate thereby determined, for example pseudoranges, is provided to a computing component PVT, which for example computes the position, velocity and time therefrom, for example using a least-squares algorithm or a Kalman filter.

The receiver RX is controlled by a controller CU—control unit. This also configures the assemblies, for example in order to select a frequency band by changing the frequency of the local oscillator LO, to configure the input filter of the high-frequency assembly RE-FE, in order to configure the bandwidth and sampling rate of the analog-to-digital converter AD or in order to select a modulation method for baseband processing BB. The data determined by the computing component PVT are provided to the controller CU by the computing component PVT. Said data may for example be further processed there and output on a user interface (not illustrated).

One or more of the assemblies may, in a variant that is not illustrated, also provide status signals to the controller CU. In one specific implementation, the baseband processing BB typically takes place on an FPGA chip or an ASIC, and the computing operations of the computing component PVT are usually implemented in the form of software components that configure a CPU/processor for these computing operations. The signal flow and the signal processing in this case in particular take place continuously, that is to say the reception signal is digitized and processed continuously.

A "code buffer memory" is a buffer memory within a signal transmission unit.

"Cryptographically" in this context means that the code is generated using a cryptographic encryption algorithm, such as for example DES, 3DES, AES, a cryptographic stream cipher and/or a cryptographic hash function. A cryptographic key preferably forms a secret between a transmitter, which transmits the messages and/or the signal sequence, and a receiver, which receives the messages or the signal sequence. The cryptographic function is preferably likewise known to the transmitter and the receiver. The cryptographic function and/or the (cryptographic) key are also used here in the PRN code generator to compute the computed sections of the PRN code sequence that serves as a basis for comparison with the generated PRN code sequence in the comparison device for comparing a duplicated section.

A PRN code is a pseudorandom code sequence that is able to be generated for example cryptographically in a PRN code generator on the basis of a cryptographic key. Cryptographic generation takes place by way of a cryptographic function, for example an encryption function, a hash function and/or a cryptographic one-way function.

The PRN codes that are generated on the basis of the digital signal and/or the simultaneously computed sections of the PRN code are in this case generated by a cryptographic function, for example an encryption function, a stream cipher, a hash function or a one-way function. By way of example, the PRN code is divided into sections with a predefined length in order to compute the PRN codes and/or the simultaneously computed sections of the PRN code.

A section of a PRN code may also be referred to as a code snippet. A section may for example have a length of 4, 8, 16, 32, 64, 128, 256, 1024, 65 536, 200 000 or 1 000 000 bits. These sections may then serve for example as the computed sections for the integrity check. The comparison may be performed through a bitwise comparison. In some embodiments, a certain number of incorrect, different bits may still be considered permissible, for example 0.001%; 0.1%; 1%; 10%, and/or exact bitwise identity may be required. It is however also possible to determine a statistical similarity parameter, for example through correlation, wherein the generated PRN code is considered to be permissible if the determined correlation value exceeds a predefined threshold value.

To generate the PRN code in the PRN code generator, it is possible for example to use a cryptographic function that for example computes the sections of the PRN code by way of a—cryptographic—key. The cryptographic function is likewise known to the transmitter and the receiver.

A processor in the context of the invention may be understood to mean for example a machine or an electronic circuit. A processor may in particular be a main processor (central processing unit, CPU), a microprocessor or a microcontroller, for example an application-specific integrated circuit or a digital signal processor, possibly in combination with a memory unit for storing program commands, etc. A processor may also for example be an IC (integrated circuit), in particular an FPGA (field-programmable gate array) or an ASIC (application-specific integrated circuit), a DSP (digital signal processor), a graphics processor GPU (graphics processing unit), a cryptocontroller, a multi-chip module and/or an SoC (system on chip). A processor may also be understood to mean a virtualized processor or a soft CPU. It may also be for example a programmable processor that is equipped with configuration steps for performing said method according to the invention or is configured with configuration steps such that the programmable processor implements or performs the inventive features of the method, the component, the modules, or other aspects and sub-aspects of the invention.

A "memory unit" in the context of the disclosure means a memory in the form of working memory (random access memory, RAM) or a hard disk.

A "module" in the context of the disclosure means a processor and/or a memory unit for storing program commands. By way of example, the processor may be designed to execute the program commands such that the processor performs functions for implementing the method according to the invention or a step of a method incorporating teachings of the present disclosure.

A "signal processing unit" is for example a correlator, a modulator and/or a mixer.

A "correlator" in the context of the disclosure means a device that uses the cross-correlation to accurately determine the time offset between two signals. Possible implementations are for example digital circuits, special computers, analog circuits or computer programs. The signals may be for example technically coded radio signals. They may for example also be radar, sonar or optical signals.

A "modulator" means a unit that modulates the signal, that is to say for example modulates it with a noise signal and/or an interference signal. In principle, however, any other modulators, for example a differential-mode mixer, ring mixer or ring modulator, a transformer, or signal linking operations such as addition, subtraction, multiplication, table lookups etc. are also referred to as modulators. These methods may be implemented in electronic form, but also digitally in the form of digital signal processing by a digital signal processor, DSP for short, or by a digital signal processing arrangement on a programmable logic chip or FPGA or an ASIC or a signal processing integrated circuit.

A "characteristic of the PRN code" means a section, that is to say what is called an integrity check snippet, whose integrity is checked for example through a bitwise comparison and/or a correlation of the computed sections of the PRN code with the generated and duplicated sections. On the other hand, a characteristic of the PRN code may also be an average value, a variance and/or one or more statistical properties of a random number sequence and/or a Fourier transform—FFT—of the time-discrete signal. The formation of an expected integrity check snippet at a determined time by the code generator may also be considered to be a characteristic of the PRN code.

A "signal transmission unit" is a receiver or a transmitter of a signal. A receiver comprises at least one antenna connector that is able to be connected to an antenna and/or an integrated antenna. The receiver has a controller—CU— comprising a processor. The signal provided by the antenna is processed in the receiver by a radiofrequency assembly, radiofrequency front end or "RF-FE", for example filtered and/or amplified, and then provided to a down converter "DC" that mixes the signal with a signal from the local oscillator LO. This procedure is also called "down conversion".

An "ASIC"—application-specific integrated circuit— component means an application-specific integrated circuit, as is mounted for example on a circuit board. These components are fixedly programmed, due to the fact that their architecture is tailored to a specific problem, they are far more efficient and faster than a functionally equivalent implementation using software in a microcontroller. In a mobile telephone, this for example has the advantage that the battery lasts longer and the device is more compact.

In some embodiments, there is a PRN code generator configured by a control unit, such as a cryptocontroller, and contains specific encryption data and/or a specific IV value. The generated PRN code is written to a buffer, that is to say a memory such as a dual-port RAM, such that it is able to be read by a signal processing unit such as a correlator, modulator and/or mixer.

In some embodiments, subsections of the PRN code sequence are computed twice. These subsections serve as integrity check snippets. These subsections are computed for example by a control unit, a cryptocontroller or a second, in particular a second restricted, PRN code generator. It is thus possible for it to be checked at runtime whether a formed duplicate of the PRN code sequence formed by the code generator actually contains the integrity check snippet subsections.

In some embodiments, the comparison may be performed in a bitwise manner, or for example via a correlation. It is possible to check the output value from a correlator, which depends on how many bits match. It is also possible to check the times at which an expected integrity check snippet is formed by the code generator.

In some embodiments, it is also possible to perform statistical checks on the PRN code sequence, for example it is possible to compute an average value or a variance, or an FFT (fast Fourier transform) may be performed and compared with an expected distribution, as is known in principle from physical random number generators. It is thereby possible to check whether the PRN code sequence that is formed actually has the statistical properties of a random number sequence.

In some embodiments, an enable signal is provided only if it is successfully checked that the expected integrity check snippet subsections actually occur in the PRN code sequence, and the signal transmission continues unhindered. If not, an enable signal is not provided. In the absence of an enable signal, writing of the PRN code sequence to the buffer memory is for example blocked, read access to the buffer memory is blocked, the buffer memory is erased, the PRN code generator is stopped and/or at least one item of internal configuration information of the code generator is erased. There may also be provision, as a result of the absence of the enable signal, in addition or as an alternative, for an alarm signal to be provided to the control unit of another component, in particular a component for monitoring malfunctions, such as for example a tamper monitor and/or a watchdog, see https://en.wikipedia.org/wiki/Watchdog_timer.

In some embodiments, the code generator may be implemented on an FPGA, see https://en.wikipedia.org/wiki/Field-programmable_gate_array; an application-specific integrated circuit "ASIC"—an embedded FPGA, that is to say embedded in an ASIC, and/or a digital signal processor, a "DSP", or a fixed or reconfigurable digital circuit. It is in particular advantageous in this case for the code generator to be reconfigurable and/or to be implemented on a reconfigurable platform.

The first processor may be designed as a reconfigurable digital circuit, such as for example an FPGA, embedded FPGA block and/or reconfigurable logic on an ASIC. The second processor may be a microcontroller, cryptocontroller and/or a CPU.

FIG. 1 shows a block diagram containing functional blocks of an RX receiver 1 according to the prior art. An antenna 3, which may be provided within the RX receiver 1, is connected via an antenna connector 2. A signal provided by the antenna 3 is processed, in the RX receiver 1 shown here, in a radiofrequency assembly 4 "radiofrequency front end", as illustrated by the arrow from the processor 5 to the radiofrequency assembly 4 in the block diagram. The processor 5 here is the controller or "control unit"—CU—of the receiver. The processing may for example comprise filtering and/or amplifying the signal. The processed signal is provided to a down converter 6 that mixes the signal with a signal from the local oscillator 7 LO and provides it to an analog-to-digital converter 8. This provides at least one digitized signal to the baseband processor 9 "BB", wherein a plurality of digitized signals may of course also be provided. Within the baseband processing 9, a cryptographic PRN code is generated by a code generator 10 on the basis of a cryptographic key 11, and a correlator 12 performs a correlation with the digitized reception signal.

In some embodiments, the baseband processing 9 BB is implemented on a field-programmable gate array chip, FPGA chip for short, or an ASIC. The baseband processing BB evaluates values that identify the satellite signal, such as for example satellite identifier, frequency band or satellite orbit data, and provides them to the controller 5. The determined pseudoranges are provided to a position/velocity/time "PVT" component, which computes the position, velocity and time therefrom.

The controller 5 controls the receiver and also configures the individual modules, such as the code generator 10. The controller 5 also configures the assemblies, for example in order to select a frequency band by changing the frequency of the local oscillator 7, or to configure the input filter of the radiofrequency module 4, or in order to configure the bandwidth and/or sampling rate of the AD converter, or in order to select a modulation method for the BB, the baseband processor or else baseband processing. The signal flow and the signal processing in this case take place continuously, that is to say the reception signal is digitized and processed continuously.

In some embodiments, the PVT computing is implemented on a CPU—that is to say a processor—in the form of software. The determined PVT data are provided by the PVT unit 13 to the controller 5, as illustrated by the arrow in the opposite direction. Said data may for example be further processed there and output on a user interface (not illustrated in FIG. 1). One or more of the assemblies may, in a variant that is not illustrated, also provide status signals to the controller 5 or control unit 5.

Figure 2:
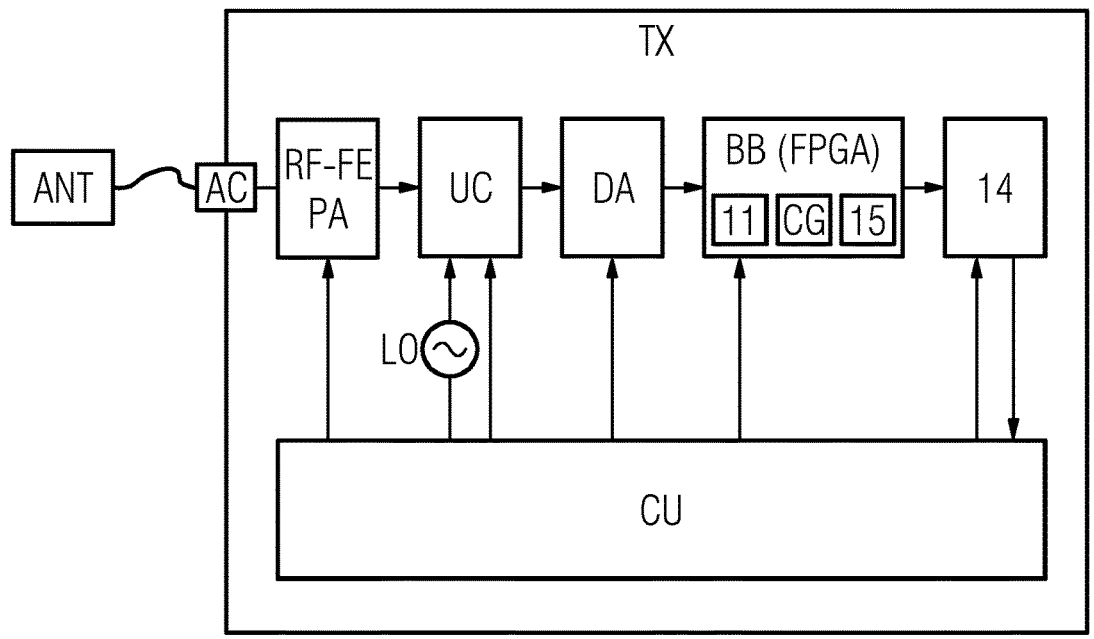
FIG. 2 is a drawing showing a transmitter that is designed in accordance with the receiver from FIG. 1.

FIG. 2 shows a transmitter that is designed in accordance with the receiver from FIG. 1. A data source 14 provides user data, which are transmitted. These data are modulated within the baseband processing 9 in the modulator 15, wherein spreading is performed using a cryptographic spread code signal that is formed by the code generator 10. A digital-to-analog conversion is performed by a DA converter, mixing up to the transmission frequency is performed by an up converter 16 "UC", and finally power amplification and filtering are performed in the radiofrequency assembly RF-FE using a power amplifier 17. In some embodiments, such a transmission and/or reception functionality may also be integrated in a transceiver.

Figure 3:
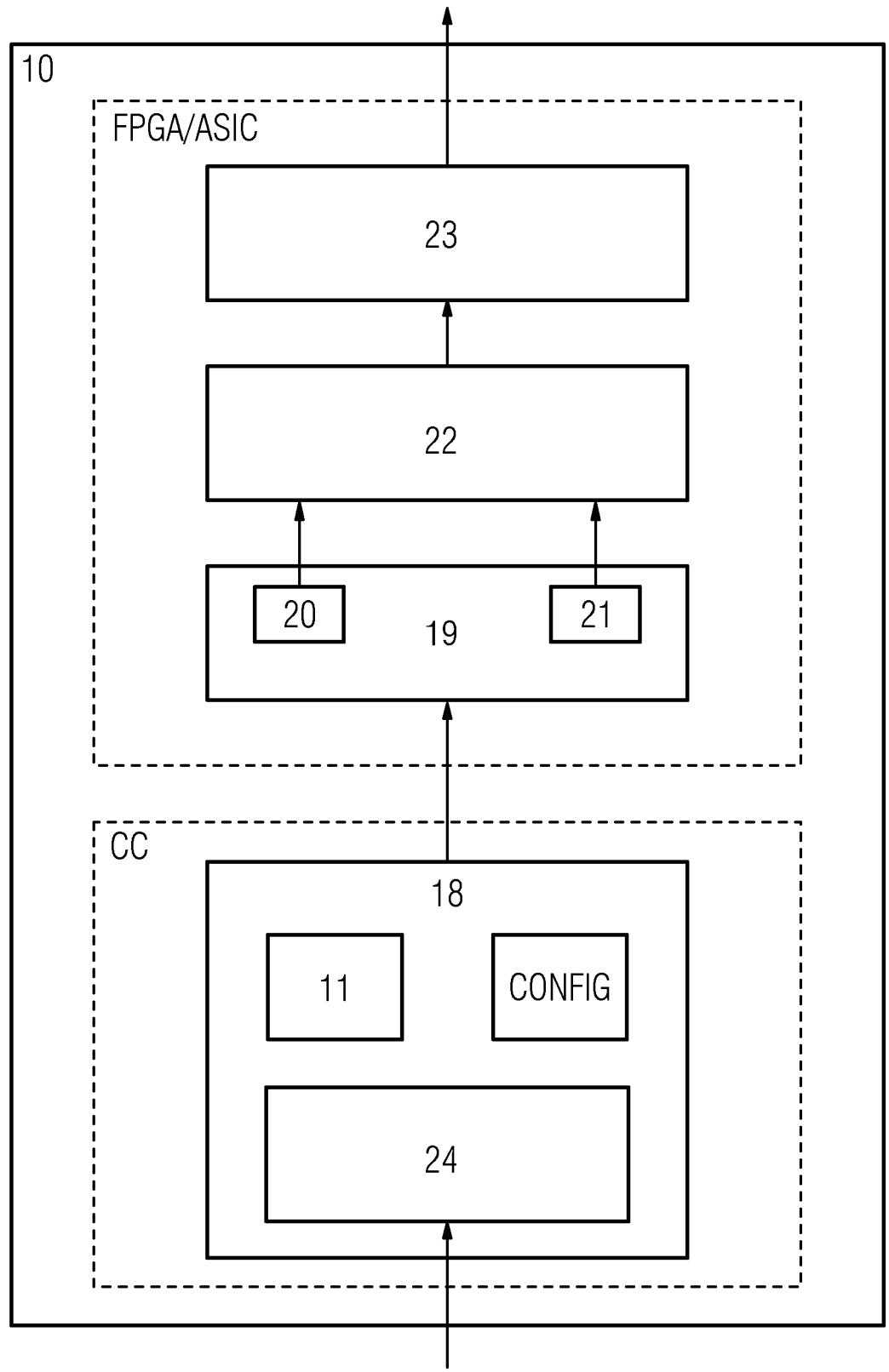
FIG. 3 shows one example of a code generator according to the prior art.

FIG. 3 shows one example of a code generator according to the prior art. What is shown is the code generator 10, which is implemented for example partly in the form of a digital circuit on an FPGA and/or on an ASIC and partly based on software in the form of a cryptocontroller "CC" 18 and/or soft CPU processor. It may be advantageous for a CG control unit, such as for example the cryptocontroller 18, to store the key data and/or configuration data. Configuration information for the FPGA/ASIC-based component of the code generator is able to be determined therefrom. In FIG. 3, the configuration information is written to a register 19, implemented here in the form of a PRN key 20 and counter value CTR 21. A PRN CG engine 22, that is to say a pseudorandom noise code generator provision unit, determines the PRN code sequence and writes it to a code buffer memory 23. This is able to be read from there by a modulator or a correlator, depending on the signal transmission unit. Instead of an ASIC/FPGA chip, any other appropriate implementation technology may also be used for the baseband processing BB, for example a digital signal processor—DSP—a network processor or a vector processor.

FIG. 4 shows one exemplary embodiment of a code generator of the signal transmission unit and a sequence of the computer-aided method for secure signal transmission incorporating teachings of the present disclosure. In addition to the left-hand part of the sequence, which is also shown in FIG. 3, it is possible to see a right-hand part of the sequence illustrated, minimized in terms of method steps. The part of the sequence illustrated on the right in the code generator, which is illustrated in FIG. 4, comprises an integrity check module according to the exemplary embodiment of the invention illustrated here.

The two synchronized modules, key management module 24 and PRN integrity check data generator module 25, generate, on the basis of the given data in the key management module 24—respectively to a reduced extent, in particular in sections—in the PRN integrity check data generator module 25, configuration information that is written firstly to the register 19 and secondly to the "PRN integrity check data" module 26, which may be designed and may operate in exactly the same way as the register 19.

The module 26 computes PRN integrity check data therefrom, which are provided to the "comparison device", in particular the "PRN code integrity check" module 27, as check data. The provision may be performed directly or via intermediate steps. In any case, the "PRN code integrity check" module 27 ultimately has at least sections of the PRN code computed in advance. This is compared, in the "PRN code integrity check" module 27, with the actual code that is likewise made available to the "PRN code integrity check" module 27 by way of a duplicator 31.

By way of example, a characteristic or a plurality of characteristics of the PRN code is/are compared for a complete or—to within a predefined extent—partial match with the duplicated PRN code in the "PRN code integrity check" module 27. The result of the comparison is processed in the "PRN code integrity check" module 27 and forwarded to a controller, which then, in the event of a test result assessed as not being a sufficiently matching result of the comparison, additionally or alternatively activates various method steps.

The controller of the "PRN code integrity check" module 27, depending on the assessment of the result of the comparison, may either fully or partly erase the information from the register 19 using the "ERASE" command 28, make the information illegible and/or overwrite it, and/or stop the determination of the PRN code sequence in the PRN CG engine 22 using the "STOP" command 29, and/or forward the "ALARM" signal 30 to the cryptocontroller 18, and/or use the "DISABLE READ" command 32 to make the content of the code buffer memory 23 partly or fully illegible. The "DISABLE READ" function is designed for example as a blocking function.

In this case, the blocking function may for example comprise blocking a write operation to the buffer memory and/or blocking read access for another component. The blocking function may in particular be designed as an overwrite function for overwriting the PRN code with replacement data, for example by overwriting with null values and/or a replacement PRN code, for example a deterministically generated, that is to say non-cryptographically generated, PRN code and/or comprise overwriting with a cryptographic replacement PRN code generated using a replacement key and/or replacement initial data.

In this case, by way of example, the function activated by the STOP command 29 may interrupt the generation of PVT data in the PRN code generator and/or signal that the integrity check has been performed with a negative outcome. Further or other responses to an alarm signal are possible, for example erasing the key PRN key replaced, replacing the key PRN key and/or the counter value CTR with a replacement value, or replacing the PRN code sequence with a replacement PRN code sequence (not illustrated). In this case, a definitively incorrect PRN code sequence is provided instead of the correct code sequence. A PRN code sequence is thus always provided, but either the PRN code sequence checked as being correct or definitively a predefined incorrect replacement PRN code sequence. As a result, an only partially correct, degraded PRN code sequence is not output. Unambiguous faulty behavior, for example of a satellite navigation receiver, is thereby able to be forced as soon as an incorrect generated PRN code sequence has been detected.

In some embodiments, the signal and/or data transmission unit has a PRN code generator, there may be at least one computed section to be compared with an actually generated PRN code sequence in the comparison device, such that the computed section is contained in the actually generated PRN code sequence within a predefined time interval. The PRN code integrity check module 27 for the integrity check compares—for example within a predefined time interval—whether the computed section(s) is/are contained in the duplicate of the actually generated PRN code.

FIG. 4 shows one implementation variant of a code generator incorporating teachings of the present disclosure. The CG control unit to this end computes PRN integrity check data, for example in sections. Sections and/or excerpts of the PRN code are to this end computed in advance. These may be provided directly as check data, or information changed to a certain degree—for example 0.001%; 0.1%; 1%, 10% of the bits incorrect—may be accepted in the assessment of the test result as still being acceptable or forming no discrepancy. It is also possible to provide other information, for example threshold values and/or check times. It is also possible to monitor how long the discrepancy is present. A discrepancy may for instance be recognized only when the discrepancy is present for longer than a predefined duration, for example 1 microsecond, 1 millisecond, 100 milliseconds, 1 second, 10 seconds.

In the first processor, the component of the code generator 10 implemented for example as an ASIC/FPGA, the PRN code sequence actually generated in the PRN CG engine 22 is duplicated in the duplicator 31 and provided to a PRN code integrity check unit PRN code integrity check module 27. This determines whether the actually generated PRN code sequence meets the check criteria defined by the PRN integrity check data in the "PRN integrity check data" module 26.

In the example illustrated in FIG. 4, the check is performed directly by the PRN code integrity check unit, the PRN code integrity check module 27. In the event of a result of the integrity check classified as a "discrepancy", the PRN code integrity check module 27 provides for example the following signals to other modules or components:
the what is called "DISABLE READ" command 32 blocks read access to the code buffer memory 23,
the "STOP" command 29 stops the PRN engine 22,
the "ERASE" command erases the current PRN CG configuration, and finally
the CG control unit, the cryptocontroller 18, provides an alarm signal in response to a corresponding signal from the PRN code integrity check module 27.

In some embodiments, check data may also for example be determined by a corresponding PRN code integrity check unit and transmitted to a CG control unit for evaluation. The systems described herein may have the advantage of being able to ensure that a PRN code sequence is actually the expected PRN code sequence. In some embodiments, the code generator itself is reconfigurable and/or when the code generator is implemented on a reconfigurable hardware platform, such as for example FPGA, embedded FPGA on an ASIC, microcoded state machine on an ASIC or FPGA. A malfunction, use of an incorrectly configured reconfigurable code generator, malicious use and/or reverse engineering of a code generator is thereby avoided or made considerably more difficult.

The methods taught herein makes it possible for the first time to dispense with a self-test for an implementation of a crypto-algorithm, and the data transmission thus takes place without a delay but still with a self-test. The teachings herein make it possible to recognize when the code generator is not operating correctly or has been manipulated.

The systems and methods described herein may be used for unidirectional and bidirectional signal transmission, for example for navigation systems, but also for all types of encryption and all encryption devices.

LIST OF REFERENCE SIGNS

1—RX receiver
2—Antenna connector (AC)
3—Antenna (ANT)
4—Radiofrequency assembly RF-FE
5—Controller, processor
6—Down converter DC
7—Local oscillator LO
8—Analog-to-digital converter AD
9—Baseband processing BB
10—Code generator CG
11—Cryptographic key KEY
12—Correlator Corr
13—Position/velocity/time component "PVT"
14—Data source
15—Modulator
16—Up converter UC
17—Power amplifier
18—Cryptocontroller
19—Register
20—PRN key
21—Counter value CTR
22—PRN CG engine
23—Code buffer memory
24—Key management
25—PRN integrity check data generator
26—PRN integrity check data
27—PRN code integrity check
28—ERASE command
29—STOP command
30—ALARM signal
31—Duplicator
32—DISABLE READ command

The invention claimed is:
1. A system including:
a signal and/or data transmission and/or encryption unit having a pseudorandom noise "PRN" code generator generating a cryptographic PRN code on the basis of a cryptographic key before any write operation is performed;
a pseudorandom noise buffer memory storing the PRN code, wherein:
the PRN code generator comprises a first processor generating the cryptographic PRN code from initial data using a cryptographic key and a second processor;
wherein the second processor generates sections of the PRN code for integrity check purposes through computation on the basis of the same cryptographic key and the same initial data, such that, within the PRN code generator and before temporary storage of the PRN code in a/the buffer memory; and
a comparison device for comparing at least one duplicated section of the PRN code sequence cryptographically generated by the first processor with the at least one section of the sections computed by the second processor;

wherein the comparison device activates a blocking, stop and/or alarm function on the basis of a predefined degree of matching between the at least one section obtained through duplication and the at least one computed section.

2. The system as claimed in claim 1, wherein the system is used for unidirectional signal transmission.

3. The system as claimed in claim 1, wherein the system is used for bidirectional data transmission.

4. The system as claimed in claim 1, implemented fully or partly in the form of a reconfigurable hardware platform.

5. The system as claimed in claim 1, implemented fully or partly in software form.

6. The system as claimed in claim 1, wherein the alarm function blocks read access to the code buffer memory.

7. The system as claimed in claim 1, wherein the stop function stops the first processor.

8. The system as claimed in claim 1, wherein the stop function is implemented in the form of an erase component.

9. The system as claimed in claim 1, further comprising an alarm signal provided to the comparison device as an alarm function.

10. The system as claimed in claim 1, wherein the comparison device includes a memory storing the determined check data from the comparison for evaluation purposes.

11. A method for secure signal transmission by way of integrity checking within a pseudorandom noise (PRN) code generator, the method comprising:
providing a digital signal for baseband processing;
generating a PRN code in the PRN code generator using a cryptographic key;
simultaneously computing at least sections of the code sequence using the PRN code generator with the same cryptographic key;
duplicating the generated PRN code;
storing the generated PRN code in the code buffer memory of the PRN code generator;
comparing the duplicate or sections thereof with the computed PRN code sections as an integrity check for the PRN code;
evaluating a result of the comparison, to select either storing the PRN code in the PRN code generator in unhindered form in the code buffer memory for correlation in the correlator and forwarded; or interrupting the signal transmission with an ALARM command 30, an ERASE command 28 and/or a DISABLE READ command 32 and/or a STOP command 29.

12. The method as claimed in claim 11, further comprising comparing at least one section, determined through simultaneous advance computation, of the code sequence with a duplicated section within a predefined time interval.

13. The method as claimed in claim 11, further comprising coupling triggering of a stop and/or alarm function as a result of the integrity check to a predefined threshold value.

14. The method as claimed in claim 13, further comprising coupling triggering of a stop and/or alarm function as a result of the integrity check to the exceedance of a predefined threshold value within a predefined time interval.

15. The method as claimed in claim 11, further comprising triggering a stop function that stops the code generation in the event of a non-match.

16. The method as claimed in claim 11, further comprising conducting encrypted unidirectional or bidirectional data transmission.

* * * * *